(12) United States Patent
Richardson et al.

(10) Patent No.: US 10,012,270 B2
(45) Date of Patent: Jul. 3, 2018

(54) ACTUATION MECHANISM FOR A MECHANICAL DIODE ASSEMBLY

(71) Applicant: Allison Transmission, Inc., Indianapolis, IN (US)

(72) Inventors: Paul A Richardson, Plainfield, IN (US); Jeremy Turner, Indianapolis, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 239 days.

(21) Appl. No.: 14/877,099

(22) Filed: Oct. 7, 2015

(65) Prior Publication Data

US 2016/0025153 A1 Jan. 28, 2016

Related U.S. Application Data

(63) Continuation of application No. 14/034,942, filed on Sep. 24, 2013, now Pat. No. 9,222,529, which is a
(Continued)

(51) Int. Cl.
*F16D 11/16* (2006.01)
*F16D 41/12* (2006.01)
(Continued)

(52) U.S. Cl.
CPC .............. *F16D 11/16* (2013.01); *F16D 19/00* (2013.01); *F16D 41/125* (2013.01); *F16D 41/14* (2013.01);
(Continued)

(58) Field of Classification Search
CPC ............... F16D 13/44; F16D 2125/582; F16D 2013/706; F16D 13/71; F16D 2300/24
(Continued)

(56) References Cited

U.S. PATENT DOCUMENTS 852,057 A 4/1907 Foster
4,083,436 A 4/1978 Straut
(Continued)

FOREIGN PATENT DOCUMENTS

JP 2001-107981 A 4/2001
KR 10-0279978 B1 2/2001
(Continued)

OTHER PUBLICATIONS

International Searching Authority: Notification of Transmittal of the International Search Report and the Written Opinion of the International Searching Authority, or Declaration; Mar. 18, 2014; 9 pages.
(Continued)

*Primary Examiner* — Stacey Fluhart
(74) *Attorney, Agent, or Firm* — Taft Stettinius & Hollister LLP; Stephen F. Rost

(57) ABSTRACT

The present disclosure provides an actuation mechanism for applying a mechanical diode clutch. The actuation mechanism includes a capsule including a cylindrical body defining an interior chamber, the cylindrical body defining a first opening at a first end and a second opening at a second end thereof. The actuation mechanism also includes a pin having a body and a radially-extending arm, the pin being retained within the interior chamber of the capsule. An apply spring is coupled at one end to the pin and a return spring is retained within the interior chamber of the capsule. The return spring is disposed between the pin on one end and the cylindrical body on the opposite end thereof. The return spring substantially surrounds the apply spring.

20 Claims, 12 Drawing Sheets

Related U.S. Application Data continuation-in-part of application No. 13/919,214, filed on Jun. 17, 2013, now Pat. No. 9,022,194.

(51) Int. Cl.
  *F16D 41/14* (2006.01)
  *F16D 19/00* (2006.01)
  *F16D 121/14* (2012.01)
  *F16D 125/58* (2012.01)

(52) U.S. Cl.
  CPC .... *F16D 2121/14* (2013.01); *F16D 2125/582* (2013.01); *F16D 2300/24* (2013.01)

(58) Field of Classification Search
  USPC .............. 192/66.31, 66.32, 69.2, 48.92
  See application file for complete search history.

(56) References Cited

U.S. PATENT DOCUMENTS

| | | | |
|---|---|---|---|
| 2,983,339 A | 5/1981 | Neff | |
| 4,348,913 A | 9/1982 | Nozawa | |
| 4,651,852 A * | 3/1987 | Wickham | B60T 8/1893 188/173 |
| 4,770,280 A | 9/1988 | Frost | |
| 5,070,978 A | 12/1991 | Pires | |
| 5,597,057 A | 1/1997 | Ruth et al. | |
| 5,964,331 A | 10/1999 | Reed et al. | |
| 5,979,627 A | 11/1999 | Ruth et al. | |
| 6,065,576 A | 5/2000 | Shaw et al. | |
| 6,176,359 B1 | 1/2001 | Krisher | |
| 6,339,977 B1 | 1/2002 | Lee et al. | |
| 6,571,926 B2 | 6/2003 | Pawley | |
| RE38,498 E | 4/2004 | Ruth et al. | |
| 7,992,695 B2 | 8/2011 | Wittkopp et al. | |
| 2002/0027055 A1 | 3/2002 | Le-Calve et al. | |
| 2004/0079598 A1 | 4/2004 | Grundwurmer et al. | |
| 2008/0223681 A1 | 9/2008 | Stevenson et al. | |
| 2012/0145505 A1 | 6/2012 | Kimes | |
| 2012/0149518 A1 | 6/2012 | Kimes | |

FOREIGN PATENT DOCUMENTS

| | | |
|---|---|---|
| WO | 02-095252 A2 | 11/2002 |
| WO | 2006063860 A2 | 5/2008 |

OTHER PUBLICATIONS

International Searching Authority; International Search Report and Written Opinion of the International Searching Authority; Nov. 20, 2014; 7 pages.

* cited by examiner

US 10,012,270 B2

ACTUATION MECHANISM FOR A MECHANICAL DIODE ASSEMBLY

RELATED APPLICATIONS

This application is a continuation application of U.S. application Ser. No. 14/034,942, filed on Sep. 24, 2013, which is a continuation-in-part application of U.S. application Ser. No. 13/919,214, filed Jun. 17, 2013, and which has issued as U.S. Pat. No. 9,022,194 on May 5, 2015. The disclosures of both applications are hereby incorporated by reference in their entirety.

FIELD OF THE DISCLOSURE

The present disclosure relates to a transmission, and in particular, to a system and method for actuating a mechanical diode assembly of the transmission.

BACKGROUND

Conventional transmission assemblies utilize clutch or clutch assemblies in a wide array of applications to selectively couple power from an input member to an output member. The input member can be a driving disk, hub, or plate and the output member can be a driven disk, hub, or plate. When the clutch or clutch assembly is engaged, power from the input member can be transferred to the output member. Many conventional transmissions incorporate different clutch designs into their respective systems for selectively transferring power from the input of the transmission to the output thereof. Some of the designs, such as a mechanical diode clutch, can provide improvements to shifting, cost, and packaging. The mechanical diode clutch can result in increased efficiency by cutting spin losses and providing fuel consumption advantages over other clutch designs.

SUMMARY

In an embodiment of the present disclosure, an actuation mechanism is provided for applying a mechanical diode clutch. The actuation mechanism includes a capsule including a cylindrical body defining an interior chamber, the cylindrical body defining a first opening at a first end and a second opening at a second end thereof; a pin having a body and a radially-extending arm, the pin being retained within the interior chamber of the capsule; an apply spring coupled at one end to the pin; and a return spring being retained within the interior chamber of the capsule, the return spring being disposed between the pin on one end and the cylindrical body on the opposite end thereof; wherein, the return spring substantially surrounds the apply spring.

In one example, the apply spring is a coil spring and the return spring is a conical spring. In a second example, the pin is movable along a substantially linear axis between an apply position and an unapply position. In a third example, the pin moves relative to the capsule between the apply and unapply positions. In a fourth example, the pin is engaged by the capsule in the unapply position. In a fifth example, the return spring biases the pin to the unapply position. In a sixth example, the apply spring is at least partially disposed outside of the capsule in the apply position and substantially enclosed by the capsule in the unapply position.

In a seventh example, the return spring is compressed within itself between the pin and capsule in the apply position; and the return spring is either decompressed or only partially compressed in the unapply position. In an eighth example, the apply spring is substantially aligned with the second opening of the capsule. In a ninth example, the apply spring is coupled to a curved end of the pin. In a tenth example, the apply spring is positioned within a bore defined in the pin. In an eleventh example, a diameter of the first opening is greater than a diameter of the second opening. In a twelfth example, a diameter of the interior chamber is about the same as the diameter of the radially-extending arm.

In another embodiment, a transmission system includes a mechanical diode clutch including an outer member and an inner member, the outer member being coupled to an outer body and the inner member being coupled to an inner body, where the outer member is structured to define a recessed opening; a strut positioned relative to the outer member for being at least partially received in the recessed opening in an apply position; an actuation member adapted to be coupled to a shift fork, the actuation member being movable between the apply position and an unapply position; a capsule including a cylindrical body defining an interior chamber, the cylindrical body defining a first opening at a first end and a second opening at a second end thereof; a pin having a body and a radially-extending arm, the pin being retained within the interior chamber of the capsule; an apply spring coupled at one end to the pin; and a return spring being retained within the interior chamber of the capsule, the return spring being disposed between the pin on one end and the cylindrical body on the opposite end thereof; wherein, the actuation member is engaged with the pin in the apply position and disengaged with the pin in the unapply position; further wherein, in the apply position, the apply spring is disposed in contact with the strut.

In one example, the capsule is coupled to the inner member of the mechanical diode clutch. In a second example, a cavity is defined between the upper member, the inner member, and the capsule. In a third example, the apply spring and the strut are movable within the cavity between the apply and unapply positions. In a fourth example, the return spring substantially surrounds the apply spring. In a fifth example, the apply spring is a coil spring and the return spring is a conical spring. In a sixth example, the pin is movable along a substantially linear axis between an apply position and an unapply position. In a seventh example, the pin moves relative to the capsule between the apply and unapply positions.

In an eighth example, the pin is engaged by the capsule in the unapply position. In a ninth example, the return spring biases the pin to the unapply position. In a tenth example, the apply spring is at least partially disposed outside of the capsule in the apply position and substantially enclosed by the capsule in the unapply position. In an eleventh example, the return spring is compressed within itself between the pin and capsule in the apply position; and the return spring is either decompressed or only partially compressed in the unapply position. In a twelfth example, the apply spring is substantially aligned with the second opening of the capsule.

In a thirteenth example, the apply spring is coupled to a curved end of the pin. In a fourteenth example, the apply spring is positioned within a bore defined in the pin. In a fifteenth example, a diameter of the first opening is greater than a diameter of the second opening. In a sixteenth example, a diameter of the interior chamber is about the same as the diameter of the radially-extending arm.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 8:
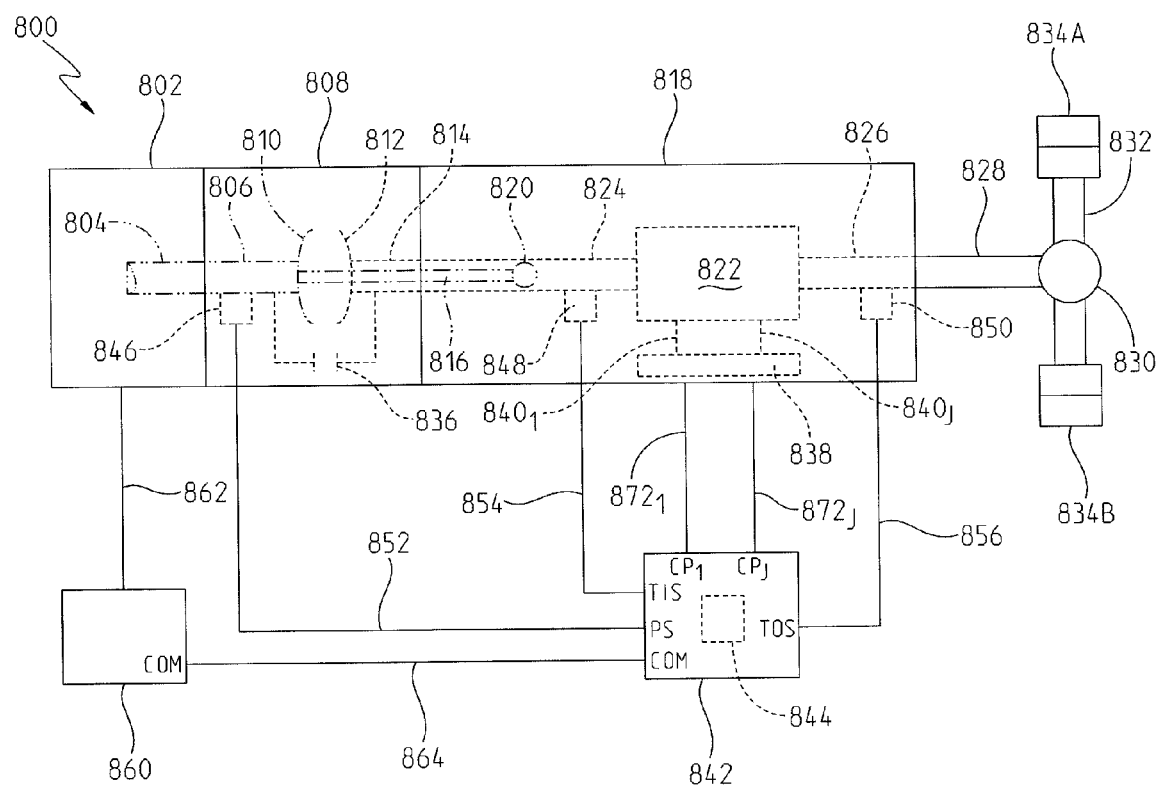
FIG. 8 is a block diagram and schematic view of one embodiment of a powered vehicular system.

Referring first to FIG. 8, a block diagram and schematic view of one illustrative embodiment of a vehicular system 800 having a drive unit 802 and transmission 818 is shown. In the illustrated embodiment, the drive unit 802 may include an internal combustion engine, diesel engine, electric motor, or other power-generating device. The drive unit 802 is configured to rotatably drive an output shaft 804 that is coupled to an input or pump shaft 806 of a conventional torque converter 808. The input or pump shaft 806 is coupled to an impeller or pump 810 that is rotatably driven by the output shaft 804 of the drive unit 802. The torque converter 808 further includes a turbine 812 that is coupled to a turbine shaft 814, and the turbine shaft 814 is coupled to, or integral with, a rotatable input shaft 824 of the transmission 818. The transmission 818 can also include an internal pump 820 for building pressure within different flow circuits (e.g., main circuit, lube circuit, etc.) of the transmission 818. The pump 820 can be driven by a shaft 816 that is coupled to the output shaft 804 of the drive unit 802. In this arrangement, the drive unit 802 can deliver torque to the shaft 816 for driving the pump 820 and building pressure within the different circuits of the transmission 818.

In FIG. 8, the transmission 818 is shown including a planetary gear system 822 having a number of automatically selected gears (i.e., each having its own discrete gear ratio). Alternatively, in a different aspect (e.g., without a torque converter), the transmission 818 may be structured as an infinitely-variable transmission (IVT) or continuously-variable transmission (CVT) which can produce an infinite number of gear ratios or speed ratios. In any event, an output shaft 826 of the transmission 818 is coupled to or integral with, and rotatably drives, a propeller or drive shaft 828 that is coupled to a conventional universal joint 830. The universal joint 830 is coupled to, and rotatably drives, an axle 832 having wheels 834A and 834B mounted thereto at each end. The output shaft 826 of the transmission 818 drives the wheels 834A and 834B in a conventional manner via the propeller or drive shaft 828, universal joint 830 and axle 832.

A conventional lockup clutch 836 is connected between the pump 810 and the turbine 812 of the torque converter 808. The operation of the torque converter 808 is conventional in that the torque converter 808 is operable in a so-called "torque converter" mode during certain operating conditions such as vehicle launch, low speed and certain gear shifting conditions. In the torque converter mode, the lockup clutch 836 is disengaged and the pump 810 rotates at the rotational speed of the drive unit output shaft 804 while the turbine 812 is rotatably actuated by the pump 810 through a fluid (not shown) interposed between the pump 810 and the turbine 812. In this operational mode, torque multiplication occurs through the fluid coupling such that the turbine shaft 814 is exposed to drive more torque than is being supplied by the drive unit 802, as is known in the art. The torque converter 808 is alternatively operable in a so-called "lockup" mode during other operating conditions, such as when certain gears of the planetary gear system 822 of the transmission 818 are engaged. In the lockup mode, the lockup clutch 836 is engaged and the pump 810 is thereby secured directly to the turbine 812 so that the drive unit output shaft 804 is directly coupled to the input shaft 824 of the transmission 818, as is also known in the art.

The transmission 818 further includes an electro-hydraulic system 838 that is fluidly coupled to the planetary gear system 822 via a number, J, of fluid paths, $840_1$-$840_J$, where J may be any positive integer. The electro-hydraulic system 838 is responsive to control signals to selectively cause fluid to flow through one or more of the fluid paths, $840_1$-$840_J$, to thereby control operation, i.e., engagement and disengagement, of a plurality of corresponding friction devices in the planetary gear system 822. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 838. In any case, changing or shifting between the various gears of the transmission 818 is accomplished in a conventional manner by selectively controlling the plurality of friction devices via control of fluid pressure within the number of fluid paths $840_1$-$840_J$.

The system 800 can further include a transmission control circuit 842 that can include a memory unit 844. The transmission control circuit 842 is illustratively microprocessor-based, and the memory unit 844 generally includes instructions stored therein that are executable by the transmission control circuit 842 to control operation of the torque converter 808 and operation of the transmission 818, i.e., shifting between the various gear ratios or speed ratios of the planetary gear system 822. It will be understood, however, that this disclosure contemplates other embodiments in which the transmission control circuit 842 is not microprocessor-based, but is configured to control operation of the torque converter 808 and/or transmission 818 based on one or more sets of hardwired instructions and/or software instructions stored in the memory unit 844.

Figure 1:
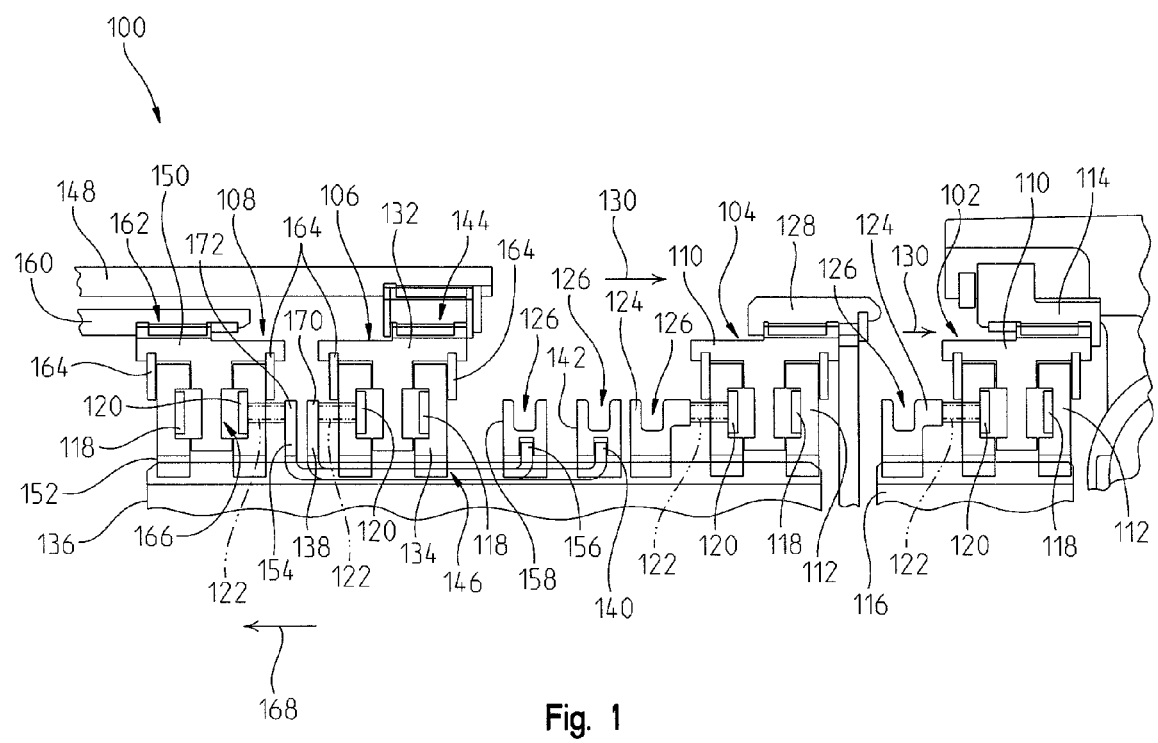
FIG. 1 is a schematic of a first embodiment of a partial transmission system.

In the system 800 illustrated in FIG. 1, the torque converter 808 and the transmission 818 include a number of sensors configured to produce sensor signals that are indicative of one or more operating states of the torque converter 808 and transmission 818, respectively. For example, the torque converter 808 illustratively includes a conventional speed sensor 846 that is positioned and configured to produce a speed signal corresponding to the rotational speed of the pump shaft 806, which is the same rotational speed of the output shaft 804 of the drive unit 802. The speed sensor 846 is electrically connected to a pump speed input, PS, of the transmission control circuit 842 via a signal path 852, and the transmission control circuit 842 is operable to process the speed signal produced by the speed sensor 846 in a conventional manner to determine the rotational speed of the turbine shaft 806/drive unit output shaft 804.

The transmission 818 illustratively includes another conventional speed sensor 848 that is positioned and configured to produce a speed signal corresponding to the rotational speed of the transmission input shaft 824, which is the same rotational speed as the turbine shaft 814. The input shaft 824 of the transmission 818 is directly coupled to, or integral with, the turbine shaft 814, and the speed sensor 848 may alternatively be positioned and configured to produce a speed signal corresponding to the rotational speed of the turbine shaft 814. In any case, the speed sensor 848 is electrically connected to a transmission input shaft speed input, TIS, of the transmission control circuit 842 via a signal path 854, and the transmission control circuit 842 is operable to process the speed signal produced by the speed sensor 848 in a conventional manner to determine the rotational speed of the turbine shaft 814/transmission input shaft 824.

The transmission 818 further includes yet another speed sensor 850 that is positioned and configured to produce a speed signal corresponding to the rotational speed of the output shaft 826 of the transmission 818. The speed sensor 850 may be conventional, and is electrically connected to a transmission output shaft speed input, TOS, of the transmission control circuit 842 via a signal path 856. The transmission control circuit 842 is configured to process the speed signal produced by the speed sensor 850 in a conventional manner to determine the rotational speed of the transmission output shaft 826.

In the illustrated embodiment, the transmission 818 further includes one or more actuators configured to control various operations within the transmission 818. For example, the electro-hydraulic system 838 described herein illustratively includes a number of actuators, e.g., conventional solenoids or other conventional actuators, that are electrically connected to a number, J, of control outputs, $CP_1$-$CP_J$, of the transmission control circuit 842 via a corresponding number of signal paths $872_1$-$872_J$, where J may be any positive integer as described above. The actuators within the electro-hydraulic system 838 are each responsive to a corresponding one of the control signals, $CP_1$-$CP_J$, produced by the transmission control circuit 842 on one of the corresponding signal paths $872_1$-$872_J$ to control the friction applied by each of the plurality of friction devices by controlling the pressure of fluid within one or more corresponding fluid passageway $840_1$-$840_J$, and thus control the operation, i.e., engaging and disengaging, of one or more corresponding friction devices, based on information provided by the various speed sensors 846, 848, and/or 850. The friction devices of the planetary gear system 822 are illustratively controlled by hydraulic fluid which is distributed by the electro-hydraulic system in a conventional manner. For example, the electro-hydraulic system 838 illustratively includes a conventional hydraulic positive displacement pump (not shown) which distributes fluid to the one or more friction devices via control of the one or more actuators within the electro-hydraulic system 838. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 842 in accordance with instructions stored in the memory unit 844.

In the illustrated embodiment, the system 800 further includes a drive unit control circuit 860 having an input/output port (I/O) that is electrically coupled to the drive unit 802 via a number, K, of signal paths 862, wherein K may be any positive integer. The drive unit control circuit 860 may be conventional, and is operable to control and manage the overall operation of the drive unit 802. The drive unit 802 may include an engine brake, exhaust brake, or similar speed-retarding device for reducing the speed of the drive unit 802. The drive unit control circuit 860 can be electrically and operably coupled to the speed-retarding device via one of the signal paths 862 to control the speed of the drive unit 802.

The drive unit control circuit 860 further includes a communication port, COM, which is electrically connected to a similar communication port, COM, of the transmission control circuit 842 via a number, L, of signal paths 864, wherein L may be any positive integer. The one or more signal paths 864 are typically referred to collectively as a data link. Generally, the drive unit control circuit 860 and the transmission control circuit 842 are operable to share information via the one or more signal paths 864 in a conventional manner. In one embodiment, for example, the drive unit control circuit 860 and transmission control circuit 842 are operable to share information via the one or more signal paths 864 in the form of one or more messages in accordance with a society of automotive engineers (SAE) J-1939 communications protocol, although this disclosure contemplates other embodiments in which the drive unit control circuit 860 and the transmission control circuit 842 are operable to share information via the one or more signal paths 864 in accordance with one or more other conventional communication protocols.

Referring to FIG. 1, one embodiment of a transmission system 100 is shown. The system 100 can be an automatic transmission having a number of discrete gear ratios. Alternatively, the system 100 can include an infinitely variable or continuously variable transmission that can provide a plurality of different gear ratios. Other possible transmission configurations are possible in the system 100.

In one example, the system 100 includes a transmission capable of operating in at least four modes. Each mode can be obtained by applying different combinations of clutch assemblies. For instance, in FIG. 1, the system can include a first mechanical diode clutch assembly 102, a second mechanical diode clutch assembly 104, a third mechanical diode clutch assembly 106, and a fourth mechanical diode clutch assembly 108. In other embodiments, there can be additional or fewer mechanical diode clutch assemblies. In FIG. 1, however, the four modes can be obtained by applying different combinations of the four mechanical diode clutch assemblies.

In FIG. 1, the first mechanical diode clutch assembly 102 and second mechanical diode clutch assembly 104 are configured in a conventional manner such that each forms a one-way clutch and is directly applied by a shift sleeve. For example, the first mechanical diode clutch assembly 102 includes an outer member 110 and an inner member 112 that can rotate relative to one another in the unapplied state (i.e., in one direction). The outer member 110 can be splined or engaged to an outer housing or body 114, whereas the inner member 112 can be splined or engaged to an inner housing or body 116. The outer body 114 and inner body 116 can form a housing, hub, drum, conically-shaped disc, bowl-shaped disc, or other body-like structure. As such, the outer member 110 can rotate in a substantially concomitant relationship as the outer housing 114 and the inner member 112 can rotate in a substantially concomitant relationship as the inner body 116.

Similar to the first mechanical diode clutch assembly 102, the second mechanical diode clutch assembly 104 can include an outer member 110 and an inner member 112. The outer member 110 can be splined or coupled to another outer body 128. Moreover, the inner member 112 can be splined or coupled to a different inner housing or body 136. For example, the inner housing or body 136 can be a gear, hub, drum, or disc.

As shown in FIG. 1, both the first and second mechanical diode clutch assemblies are shown in unapplied states. To apply or move the assemblies into engaged or applied states, a shift sleeve 124 can be actuated by a shift fork (not shown) and moved in a direction indicated by arrow 130. To do so, the shift sleeve 124 can include a recess or defined slot 126 into which the shift fork (not shown) can be disposed. On one side of the shift sleeve 124 nearest its respective mechanical diode clutch assembly, a spring 122 is coupled thereto. The spring 122 can be compressed as the shift sleeve 124 is moved in the apply direction (i.e., direction 130) against a first strut 120. On the opposite side of the outer member 110 is a second strut 118. The first strut 120 and second strut 118 can allow the mechanical diode clutch assembly to free-wheel as it rotates in one direction and is locked or prevented from rotating in the opposite direction. As the shift sleeve 124 is moved in direction 130, the spring 122 urges the first strut 120 into a recess formed in the outer member 110 to lock the outer and inner members to one another and apply the clutch in a manner similar to that of a dog clutch. The second strut 118 can be disposed in continuous engagement to allow rotation in only one direction. The first strut 120 can be engaged, and in doing so, it can lock the clutch assembly such that the clutch assembly does not rotate in the one direction.

The system 100 of FIG. 1 also includes the third mechanical diode clutch assembly 106 and fourth mechanical diode clutch assembly 108. The third mechanical diode clutch assembly 106 can include an outer member 132 and an inner member 134. A retaining ring 164 can be disposed to couple the outer member 132 and inner member 134 to one another as shown. The outer member 132 can be splined or coupled to an outer housing or drum 148 at a spline location 144. The inner member 134 can be splined or coupled to an inner body such as a ring gear 136 at an inner spline location 146. In FIG. 1, the inner member 134 of the third mechanical diode clutch assembly 106 and the inner member 112 of the second mechanical diode clutch assembly 104 can be splined or coupled to the same inner body or ring gear 136. In other embodiments, however, the two inner members can be coupled to different inner bodies.

The fourth mechanical diode clutch assembly 108 can also include an outer member 150 and an inner member 152. Another retaining ring 164 can be provided for coupling or positioning the inner member 152 adjacent to the outer member 150 as shown in FIG. 1. The outer member 150 can be splined or coupled to an outer body or housing 160 at a spline location 162. Moreover, the inner member 152 can be splined or coupled to an inner body such as the ring gear 136. In other embodiments, the inner member 152 can be splined or coupled to an independent body or housing unlike that shown in FIG. 1.

The third mechanical diode clutch assembly 106 can be actuated or applied in a manner different from the first and second mechanical diode clutch assemblies. The third mechanical diode clutch assembly 106 does include a shift sleeve 142 having an opening defined in its upper surface for being removably coupled to a shift fork (not shown). However, as shown, the shift sleeve 142 is positioned in such a manner that it is not directly accessible to induce movement of a first strut 120 for applying or engaging the third mechanical diode clutch assembly 106.

As described above, the second strut 118 is structured to allow each mechanical diode clutch assembly to free-wheel as it rotates in one direction and is locked or prevented from rotating in the opposite direction. While in regards to the first and second mechanical diode clutch assemblies, the shift sleeves 126 were positioned directly adjacent to the first strut 120 such that the spring 122 was directly attached to an apply side of the shift sleeve. As such, movement of the shift sleeve 126 along direction 130 resulted in the spring 122 inducing movement of the first strut 120 to engage the outer members 110 in the apply state.

Referring back to the third mechanical diode clutch assembly 106, the shift sleeve 142 can include a notch or groove defined in its lower portion for receiving an actuation plate 138. In particular, the actuation plate 138 can include a partially or substantially bent or curved end 140 that is received in the notch or groove of the shift sleeve 142. This engagement or coupling between the end 140 of the actuation plate 138 and the shift sleeve 142 can result in substantially concomitant movement between the shift sleeve 142 and actuation plate 138. In other words, as the shift sleeve 142 moves along direction 130, the actuation plate 138 can also be moved in a similar manner and in the same direction 130. Thus, axial or linear movement of the shift sleeve 142 results in axial or linear movement of the actuation plate 138.

The actuation plate 138 can be a substantially planar plate formed of aluminum, steel, or other material. While the actuation plate 138 is substantially planar along its length, the first end 140 and second end 170 are curved or bent. While the first end 140 is bent or curved for engaging a notch or groove in the shift sleeve 142, the second end 170 can also be bent or curved for engaging or applying the first strut 120. Here, the second end 170 is bent or curved in a direction towards the outer member 132. In FIG. 1, the first end 140 and second end 170 are shown bent or curved in the same direction. In other embodiments, however, this may be different. On an apply side of the second end 170 of the actuation plate 138, a spring 122 can be coupled thereto. As such, as the shift sleeve 142 is moved along direction 130, the actuation plate 138, most notably the second end 170, moves the spring 122 into contact with the first strut 120. In one aspect, the first strut 120 can be affixed to the spring 122. In another aspect, the first strut 120 can be removably coupled to the spring 122.

As the first strut 120 is moved by the actuation plate 138, it is moved into a recessed portion 166 of the outer member 132. In one aspect, the first strut 120 can be completely disposed in the recessed portion 166. In a different aspect, the first strut 120 may only be partially disposed in the recessed portion 166. In any event, by moving the first strut at least partially into the recessed portion, the third mechanical diode clutch assembly 106 is disposed in an apply condition or state. As such, the outer member 132 and lower member 134 are coupled to one another in the apply condition or state.

The fourth mechanical diode clutch assembly 108 can be actuated between an unapply state and an apply state via movement of a different actuation plate 154. The actuation plate 154 can include a first end 156 and a second end 172. The first end 156 of the actuation plate 154 can be bent or curved in such a manner that it can be received within a notch or groove defined in a lower portion of a fourth shift sleeve 158. As shown in FIG. 1, the shift sleeve 158 can include a defined opening 126 in its upper portion for coupling or engaging with a shift fork (not shown). The shift fork (not shown) can induce movement in the shift sleeve 158 for moving the fourth mechanical diode clutch assembly 108 between the apply and unapply states.

The second end 172 of the actuation plate 154 can also be bent or curved in such a manner to induce substantially axial movement of a first strut 120 and spring 122. The spring 122 can be affixed or coupled to the second end 172. For instance, the spring 122 can be removably coupled to either the first strut 120 or second end 172. Alternatively, the first strut 120 and spring 122 can be coupled to the second end 172 in both the apply and unapply states. In the apply state, the first strut can be moved into a recessed portion 166 of the outer member 150 of the fourth mechanical diode clutch assembly 108. In the unapply state, a second strut 118 can be positioned such that the fourth mechanical diode clutch assembly can freely rotate in one direction, but is precluded from rotation in an opposite direction thereof.

To engage the fourth mechanical diode clutch assembly 108, the shift sleeve 158, actuation plate 154, and first strut 120 are moved in a direction indicated by arrow 168. As shown in FIG. 1, direction 168 is substantially opposite from direction 130. Unlike the conventional first and second mechanical diode clutch assemblies, the third and fourth mechanical diode clutch assemblies are positioned in a manner such that the shift forks and shift sleeves for the third and fourth diodes are not directly adjacent thereto. Instead, in one embodiment, the outer member 132 of the third mechanical diode clutch assembly 106 can be coupled to a first drive mechanism 148 such as a hub, for example, and the outer member 150 of the fourth mechanical diode clutch assembly 108 can be coupled to a second drive mechanism 160 such as a rotating hub or body. In any event, the drive mechanisms 148, 160 provide an obstruction or block access to either the third or fourth mechanical diode clutch assembly. As such, the shift sleeves for these mechanical diode clutch assemblies cannot apply the diodes in the same manner as the first two conventional assemblies and thus include actuation plates.

In the embodiment of FIG. 1, the apply side of the third and fourth mechanical diode clutch assemblies can be positioned such that both sides face one another. This can allow a combination of a shift fork and shift sleeve to apply both clutch assemblies.

Moreover, in the unapply state, the inner members of the third and fourth mechanical diode clutch assemblies can rotate faster than the outer members. As described above, on the unapply side (i.e., the side in which the second strut 118 is positioned) of both diodes there is no spring to couple or lock the outer and inner members to one another. As such, when there is a differential speed between the outer and inner members, the clutch assemblies can free wheel in at least one direction. On the other hand, as the actuation plates move the spring 122 and first struts 120 into contact with the recessed portion 166 of the outer members, the inner and outer members form a one-way clutch. In one aspect, the mechanical clutch diode cannot free wheel in the applied state and thereby becomes a locked assembly and a mechanical clutch.

In FIG. 1, the third mechanical diode clutch assembly 106 can be structured such that it freely rotates in the same direction as the first and second clutch assemblies. The fourth mechanical diode clutch assembly 108, however, free wheels in the direction opposite of the third mechanical diode clutch assembly since it is applied from a different side of the diode. As shown in FIG. 1, the actuation plate 154 for applying the fourth mechanical diode clutch assembly 108 at least partially is disposed underneath a portion of the third mechanical diode clutch assembly 106.

Figure 2:
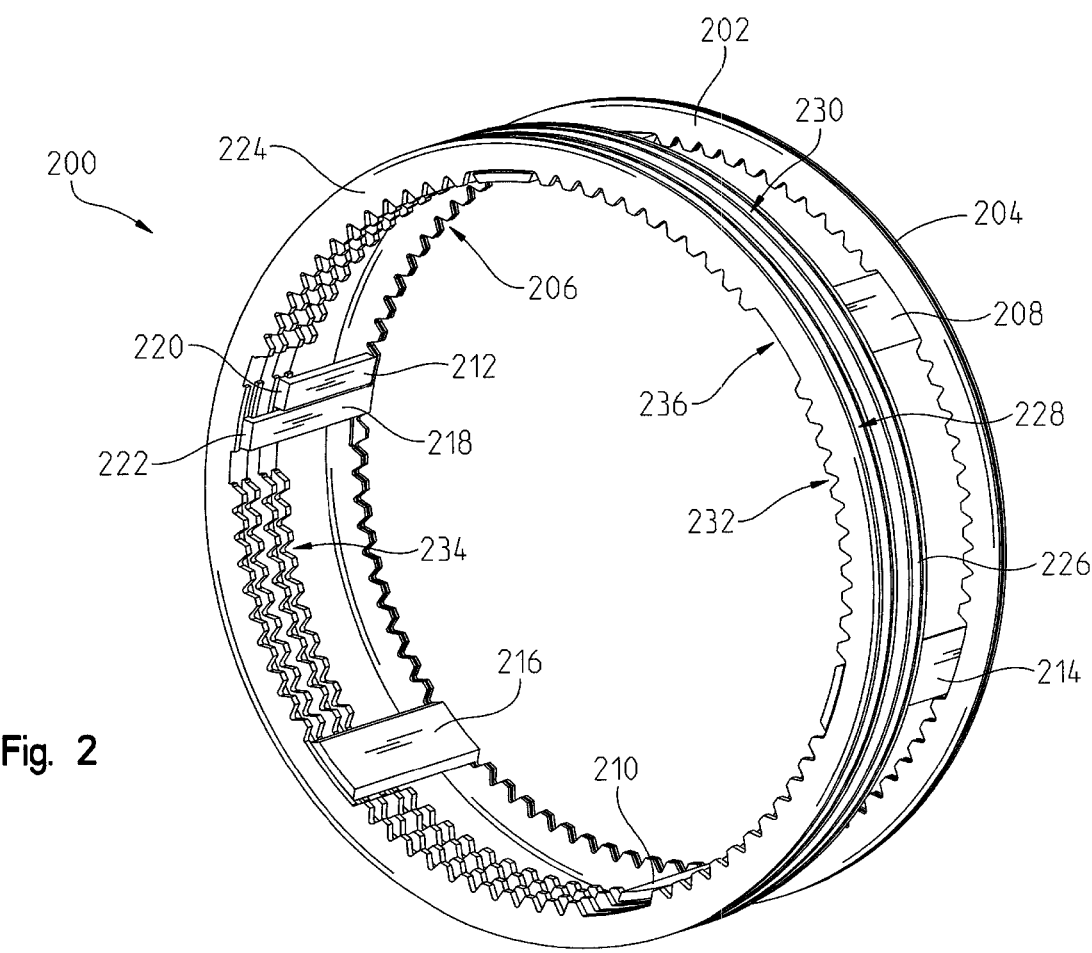
FIG. 2 is a side perspective view of an actuation plate for mechanically actuating a mechanical diode clutch assembly.

Referring to FIG. 2, one embodiment of an actuation system 200 of a transmission is shown. The actuation system 200 is similar to that shown in FIG. 1 for applying and unapplying the third and fourth mechanical diode clutch assemblies. The actuation system 200 can include a first actuation plate 202 and a second actuation plate 204. The first actuation plate 202 and second actuation plate 204 can include internal splines 206 for engaging corresponding splines or teeth on the internal body or ring gear 136 of FIG. 1.

The actuation system 200 can also include a first shift sleeve 226 and a second shift sleeve 224. The first shift sleeve 226 can include internal splines 234 for engaging corresponding splines on the internal body or ring gear 136. Similarly, the second shift sleeve 224 can include internal splines 232 for engaging the internal body or ring gear 136. Moreover, at the outer surface or diameter of the first shift sleeve 226, a radial groove or slot 230 is defined therein. The radial groove or slot 230 can receive a shift fork (not shown) similar to the defined slots 126 in FIG. 1. The second shift sleeve 224 can also include a defined radial groove or slot 228 along its outer surface or diameter for receiving a shift fork (not shown).

The manner in which the shift fork (not shown) induces movement in the first and second actuation plates is also shown in FIG. 2. The first actuation plate 202 can include a plurality of legs that extend from the plate 202 to the first shift sleeve 226. In FIG. 2, the plurality of legs can include a first leg 208, a second leg 210, and a third leg 212. Although only three legs are shown in FIG. 2, there can be any number of legs in other embodiments. Each of the first leg 208, second leg 210, and third leg 212 can include a bent or curved end 222 for engaging a defined groove or notch defined in the first sleeve 226. In particular, the bent or curved end 222 of each leg is similar to the bent end 140 of actuation plate 138 and the bent end 156 of actuation plate 154 in FIG. 1. In addition, each of the bent ends 222 of the plurality of legs coupled to the first actuation plate 202 can engage or couple to the first shift sleeve 226 in areas 236 where the shift sleeve 226 does not include any internal splines. Similarly, the internal body or ring gear 136 can also be designed without splines in areas where the plurality of legs are disposed.

The second actuation plate 204 can also include a plurality of legs as shown in FIG. 2. For instance, the plurality of legs can include a first leg 214, a second leg 216, and a third leg 218. Although only three legs are shown in FIG. 2, it is possible for any number of legs to be provided in other embodiments. Similar to the legs of the first actuation plate 202, each of the first leg 214, second leg 216, and third leg 218 can include bent or curved ends 220 for engaging a corresponding groove or notch defined in the second shift sleeve 224. Each of the bent ends 220 of the plurality of legs coupled to the second actuation plate 204 can engage or couple to the second shift sleeve 224 in areas 236 where the shift sleeve 224 does not include any internal splines. Similarly, the internal body or ring gear 136 can also be designed without splines in areas where the plurality of legs are disposed.

The plurality of legs can allow movement of the shift sleeves to induce substantially concomitant movement in the first and second actuation plates. As shown in FIGS. 1 and 2, the plurality of legs of each actuation plate can slide during an apply or unapply movement through areas of missing gear teeth or splines on the outer surface or diameter of the ring gear 136 or body. In FIG. 2, there are at least six areas along the circumference or outer diameter of the ring gear 136 or body that is absent of splines or teeth. The number of areas of missing teeth or splines can depend on the number of actuation plates and number of legs. Moreover, referring to the embodiment in FIG. 1, each of the plurality of legs can also be disposed underneath at least a portion of the third mechanical diode clutch assembly 106.

During assembly, each of the plurality of legs can be bent or moved inwardly to engage the shift sleeve. Once the plurality of legs are coupled to the shift sleeve, the additional coupling of the ring gear 136 or body to the actuation system further couples the actuation plates to the sleeves. In at least one embodiment, the ring gear or body can prevent dislodgement of the bent or curved end in the recess or notch defined in the shift sleeve.

In the embodiments of FIGS. 1 and 2, each actuation plate can engage a spring 122 for applying a clutch assembly. In one embodiment, there can be three or more springs spaced around and positioned between the actuation plate and first strut 120. In a related embodiment, the number of springs may correlate to the number of struts in the design.

Figure 3:
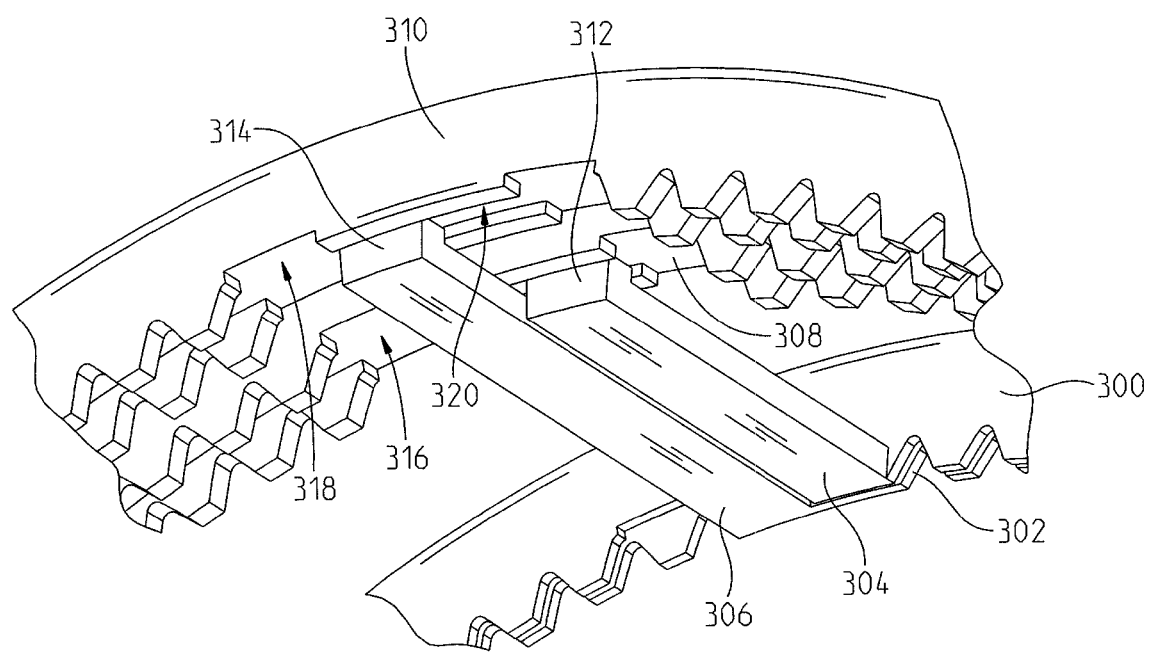
FIG. 3 is a side perspective view of another actuation plate for mechanically actuating a mechanical diode clutch assembly.

Referring to FIG. 3, a different embodiment of an actuation system is shown. Here, a first actuation plate 300 and a second actuation 302 form part of the system. The first actuation plate 300 includes at least one leg 304 having a bent or curved end 312. The second actuation plate 302 also includes at least one leg 306 having a bent or curved end 314. The actuation system also includes a first shift sleeve 308 and a second shift sleeve 310. Each of the first and second shift sleeves can be actuated or moved by a shift fork of a synchronizer assembly. Other means or mechanisms for actuating the shift forks may be possible as well. The first shift sleeve 308 can include an opening 316 for receiving the bent or curved end 312 of the first actuation plate 300. Similarly, the second shift sleeve 310 can include an opening 318 for receiving the bent or curved end 314 of the second actuation plate 302. As the opening 316, 318 in either shift sleeve receives the bent or curved end of either actuation plate, the received end can be rotated by a relatively small angle to be received within a groove or slot 320 of the shift sleeve. In this manner, the shift sleeve can receive the corresponding bent or curved end in a bayonet-like fitting. There may be other ways for engaging the actuation plate to the shift sleeve, and the embodiments of FIGS. 1-3 only provide limited examples of how to do so. These illustrated embodiments are not intended to be limiting, and any means for engaging and securing the legs of the actuation plate to the shift sleeve may be used.

Figure 4:
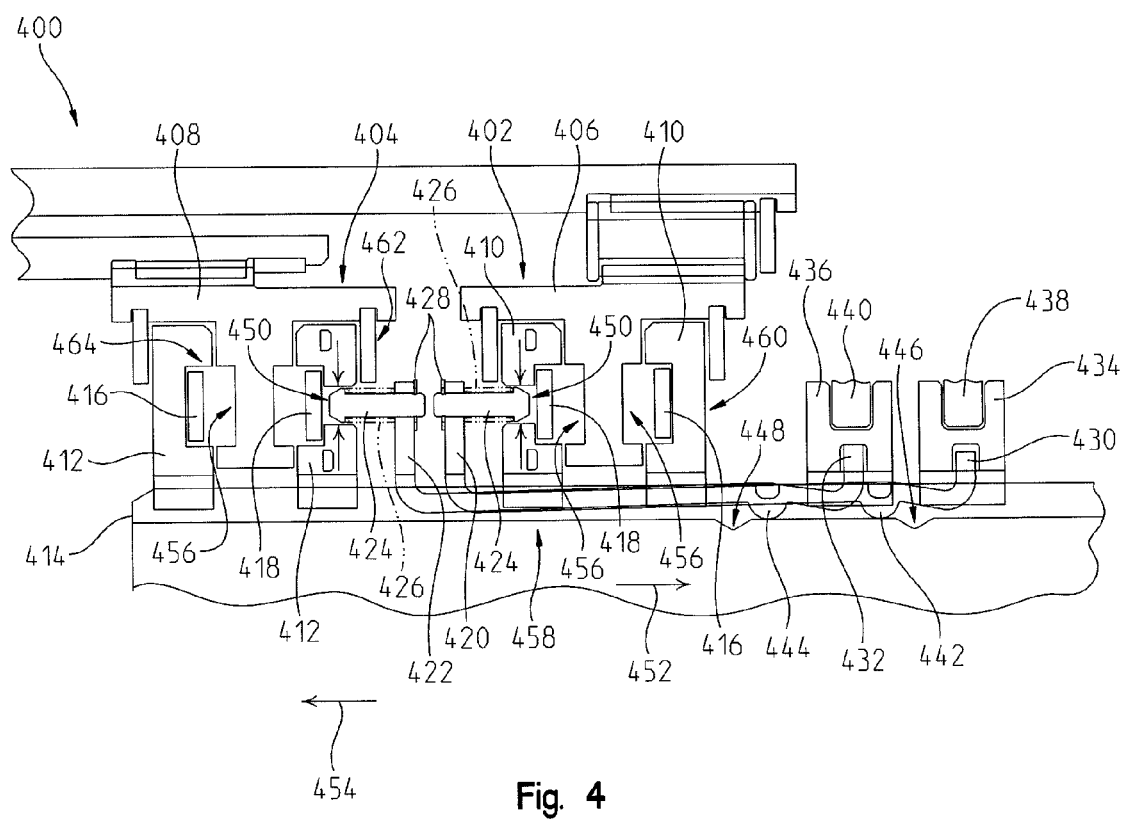
FIG. 4 is a schematic of a second embodiment of a partial transmission system.

In FIG. 4, a different embodiment of a transmission system 400 is shown. The transmission system 400 can include a first mechanical diode clutch assembly 402 and a second mechanical diode clutch assembly 404. The first mechanical diode clutch assembly 402 can include an outer member 406 and an inner member 410 that can rotate relative to one another at different speeds in an unapplied state or at about the same speed in the applied state. The inner member 410 can be coupled to or splined to an inner body such as a ring gear 414. In other aspects, the inner body can be any type of housing, body, drum, or hub. Like the first mechanical diode clutch assembly 402, the second mechanical diode clutch assembly 404 can also include an outer member 408 and an inner member 412. The inner member 412 can be coupled or splined to an inner body such as the ring gear 414. In other aspects, the inner member 412 can be coupled to an inner body that is different from the inner body to which inner member 410 is coupled or splined.

In an applied state, the outer and inner members can rotate in a concomitant relationship to one another, i.e., at about the same speed. In an unapplied state, however, the inner member 412 can rotate at a faster speed than the outer member 408. Similar to the embodiment of FIG. 1, the first and second mechanical diode clutch assemblies can rotate in a free wheel manner in one direction in the unapplied state, whereas in the applied state the inner and outer members form a substantially one-way clutch configuration.

As shown in FIG. 4, the outer members 406, 408 can include a T-shaped cross-section that defines a recessed portion 456 in each of its apply side and unapply side. For example, the outer member 406 has an apply side 458 and an unapply side 460. On the apply side 458 is a first strut 418 that can be moved at least partially into the recessed portion 456 defined in the apply side 458 of the outer member 406 to engage or apply the first mechanical diode clutch assembly 402. On the unapply side 460 of the outer member 406 is a second strut 416 that can allow for the diode to free wheel in one direction in the unapplied state. The outer member 408 of the second mechanical diode clutch assembly 404 can also include an apply side 462 and an unapply side 464. The outer member 408 can include a T-shaped cross-section that defines recessed portions 456 at both the apply side 462 and unapply side 464. A first strut 418 is disposed on the apply side 462 of the outer member 408 and a second strut is disposed on the unapply side 464. The second mechanical diode clutch assembly 404 can be engaged or applied by moving the first strut into the recessed portion 456 on the apply side 462 of the outer member 408.

The first and second mechanical diode clutch assemblies in FIG. 4 can include many of the same features and characteristics as the third and fourth mechanical diode clutch assemblies shown FIG. 1 and previously described. For example, both diodes in FIG. 4 are positioned such that the apply sides of both diodes are disposed internally within the transmission system and cannot be directly accessed by a shift sleeve (e.g., such as by the manner in which the conventional first and second mechanical diode clutch assemblies are actuated).

In FIG. 4, a first actuation plate 420 can be used to actuate or engage the first mechanical diode clutch assembly 402 and a second actuation plate 422 can be used to actuate or engage the second mechanical diode clutch assembly 404. The first and second actuation plates can be structured similarly to the actuation plates in FIG. 2, where each actuation plate includes a plurality of legs that extend between the plate and a bent or curved end adapted to engage a shift sleeve. For instance, the first actuation plate 420 can include a bent or curved end 430 that can be received within a groove or notch defined in a portion of a first shift sleeve 434. The manner in which the bent or curved end 430 engages the first shift sleeve 434 can be via a snap connection, bayonet-like fitting, tongue-in-groove connection, or any other type of connection. The first shift sleeve 434 can include another notch or opening for receiving a first shift fork 438. The first shift fork 438 can move the first shift sleeve 434 to induce movement in the first actuation plate 420.

At the opposite end of the bent or curved end 430, the first actuation plate can include a second bent or curved end that forms the apply portion of the plate. This second end, or apply portion, of the actuation plate 420 can include a defined opening through which a pin 424 is coupled to the actuation plate 420. The pin 424 can include a groove or notch defined in its outer surface or diameter so that a retaining ring or clip 428 can secure the pin 424 to the actuation plate 420. The retaining ring or clip 428 is coupled near one end of the pin 424, whereas the opposite end of the pin 424 can include a chamfered nose 450. The chamfered nose 450 can include an outer wing-like radius that allows a spring 426 to be disposed between this outer radius and the actuation plate, as shown in FIG. 4.

As the first mechanical diode clutch assembly 402 is applied, the first shift fork 438 moves the first shift sleeve 434 along a direction indicated by arrow 452. In doing so, the first shift sleeve 434 induces similar movement in the first actuation plate 420 via the connection between the bent or curved end 430 and the shift sleeve 434. As the first actuation plate 420 moves along direction 452, the pin 424 also moves in the same direction. As the pin continues to move in direction 452, the chamfered nose 450 comes into contact with the first strut 418. The initial contact between the chamfered nose 450 and first strut 418 may cause the spring to compress by a small amount, thereby allowing the pin 424 to slide axially along a direction indicated by arrow 454 relative to the actuation plate 420. For purposes of this disclosure, the axial direction is the same as the apply or unapply direction, i.e., along directions 452 and 454. As the actuation plate 420 continues to move along direction 452, the pin 424 can urge the first strut 418 into the recessed portion 456 of the outer member 406. The first strut 418 can move axially with the pin 424, or it may pivot such that only a portion of the first strut 418 is disposed in the recessed portion 456. In any event, the first strut 418 can be moved at least partially into the recessed portion 456 to couple the outer member 406 and inner member 410 to one another.

As the pin 424 moves the first strut 418 into the recessed portion 456 of the upper member 406, there can be a position at which the first strut 418 is disposed as far as it will go into the recessed portion 456. Any additional movement of the pin 424 along direction 452 may result in the pin 424 being urged by first strut in direction 454. In doing so, the spring 426 can compress between the second end of the first actuation plate 420 and the pin 424. Here, the pin 424 moves along direction 454 relative to the first actuation plate 420. The retaining ring or clip 428 can permit limited axial movement of the pin 424 along direction 454, and as soon as the actuation plate 420 is disengaged or moved along the unapply direction 454 the spring 426 can return the pin 424 to its normal position.

In FIG. 4, the pin 424 is shown passing through an opening defined in the inner member 410 of the first mechanical diode clutch assembly 402. The opening in the inner member 410 can be sized to the approximate diameter D of the chamfered nose 450. In other aspects, the opening may be sized slightly larger than the diameter or width of the pin 424. In any event, the chamfered nose 450 allows the pin 424 to pass through the opening and move relative thereto during operation.

The second actuation plate 422 can also include a bent or curved end 432 that can be received within a groove or notch defined in a portion of a second shift sleeve 436. The manner in which the bent or curved end 432 engages the second shift sleeve 436 can be via a snap connection, bayonet-like fitting, tongue-in-groove connection, or any other type of connection. The second shift sleeve 436 can include another notch or opening for receiving a second shift fork 440. The second shift fork 440 can be part of a synchronizer assembly (not shown) that be operated according to known methods. The second shift fork 440 can move the second shift sleeve 436 to induce movement in the second actuation plate 422.

At the opposite end of the bent or curved end 432, the second actuation plate 422 can include a second bent or curved end. This second bent or curved end can form the apply portion of the actuation plate. Moreover, this second bent end, or apply portion, of the actuation plate 422 can include a defined opening through which a pin 424 is coupled to the actuation plate 422. The pin 424 can include a groove or notch defined in its outer surface or diameter so that a retaining ring or clip 428 can secure the pin 424 to the actuation plate 422. The retaining ring or clip 428 is coupled near one end of the pin 424, whereas the opposite end of the pin 424 can include a chamfered nose 450. The chamfered nose 450 can include an outer wing-like radius that allows a spring 426 to be disposed between this outer radius and the actuation plate, as shown in FIG. 4. In this way, the first actuation plate 420 and second actuation plate 422 are structured similarly.

As the second actuation plate 422 is moved by the second shift sleeve 436 to apply or engage the second mechanical diode clutch assembly 408, the second actuation plate 422 and pin 424 are moved along direction 454. Here, the second actuation plate 422 moves in the opposite direction as the first actuation plate 420 when both plates are moved in the apply direction. Similarly, as the second actuation plate 422 is moved in the unapply direction 452, the unapply direction 452 of the second actuation plate 422 is opposite the unapply direction 454 of the first actuation plate 420. In this embodiment, the apply side 458 of the first mechanical diode clutch assembly 402 is on the left side as shown in FIG. 4, whereas the apply side 462 of the second mechanical diode clutch assembly 404 is on the right side thereof in FIG. 4. The actuation plates of both diodes can be radially offset from one another similar to that shown in FIG. 2.

In FIG. 4, the actuation plates can include detents that can limit movement of the actuation plates. For instance, the first actuation plate 420 can include a first dimple 442 disposed on its inner surface. The first dimple 442 can be received in a corresponding notch 446 defined in an outer surface of the ring gear 414. Similarly, the second actuation plate 422 can include a second dimple 444 disposed on its inner surface. The second dimple 444 can be received in a corresponding notch 448 defined in the outer surface of the ring gear 414.

In this embodiment, the first dimple 442 can be received in the notch 446 when the first actuation plate 420 is moved in direction 452 to apply the first mechanical diode clutch assembly 402. As the dimple 442 is received in the notch 446, the first actuation plate 420 can be limited or prevented from moving any further in the apply direction 452. The size and shape of the notch 446 can facilitate the limited movement of the first actuation plate 420 in direction 452, but allow the first actuation plate 420 to move freely from the notch 446 in the unapply direction 454. In addition, the interaction between the first dimple 442 and notch 446 can also to dampen the spring load so that the load does not create a power loss at the fork/sleeve interface.

The second dimple 444 can be received in the notch 448 when the second actuation plate 422 is moved in direction 454 to apply the second mechanical diode clutch assembly 404. As the dimple 444 is received in the notch 448, the second actuation plate 422 can be limited or prevented from moving any further in the apply direction 454. The size and shape of the notch 448 can further facilitate the limited movement of the second actuation plate 422 in direction 454, but allow the second actuation plate 422 to move freely from the notch 448 in the unapply direction 452.

In one aspect, the retaining rings or clips 428 can limit or prevent the pins 424 from moving relative to the first and second actuation plates in the apply state. Thus, to prevent the pins 424 from reaching a dead-headed position relative to the first struts 418, the notches 446, 448 can limit further movement of the actuation plates in the apply direction. As such, the springs 426 can provide damping to the actuation plates and the notches can define movement thereof.

Figure 5:
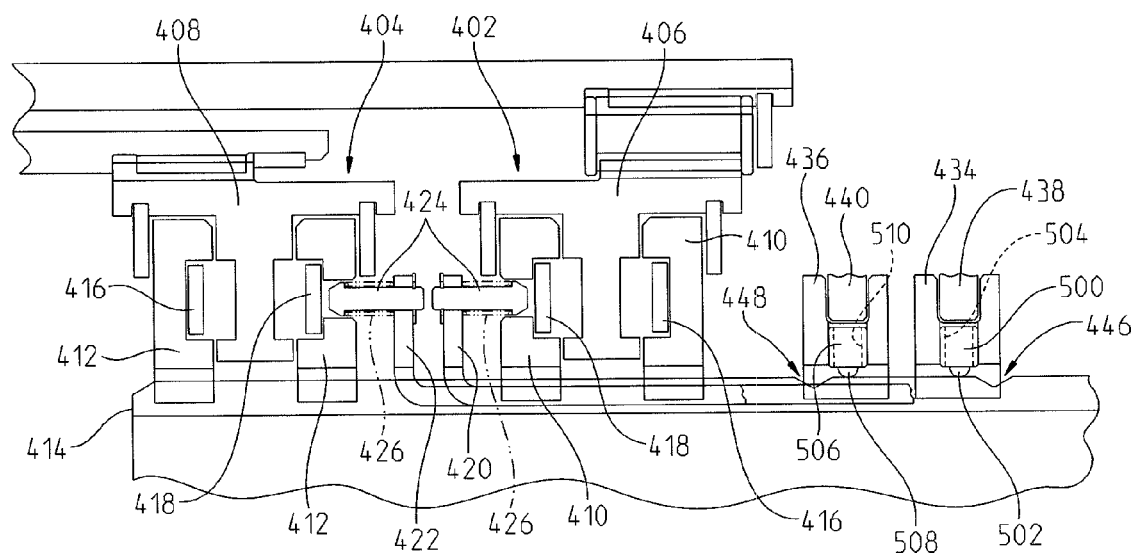
FIG. 5 is a schematic of a third embodiment of a partial transmission system.

Turning to FIG. 5, a related embodiment to that of FIG. 4 is shown. Features shown in FIG. 4 and described above are shown in FIG. 5 with the same reference numbers. Unlike the embodiment of FIG. 4, however, the first actuation plate 420 and second actuation plate 422 do not include dimples on each respective inner surface. Instead, the first shift sleeve 434 is structured to include a pin 500 disposed within an internal cavity thereof. The pin 500 can include a partially hollow chamber in which a retractable ball 502 and spring 504 are disposed. The ball 502 can be coupled to one end of the spring 504 and is capable of moving in a direction substantially orthogonal to either apply direction 452, 454. Similarly, the second shift sleeve 436 is structured to include a pin 506 disposed within an internal cavity thereof. The pin 506 can also include a partially hollow chamber similar to pin 500, such that a retractable ball 508 and spring 510 are disposed therein. The ball 508 can be coupled to one end of the spring 510 and is capable of moving in a direction substantially orthogonal to either apply direction 452, 454.

As the first actuation plate 420 is moved in the apply direction 452, the first shift sleeve 434 also moves in the same direction. As the shift sleeve 434 continues to move in this direction, the ball 502 can be received in the notch 446 defined in the outer surface of the ring gear 414. Likewise, as the second shift sleeve 436 moves in the apply direction 454, the ball 508 can be received in the other notch 448 defined in the outer surface of the ring gear 414. The notches 446, 448 can function like detents and limit the movement of the shift sleeves in the respective apply directions and further prevent or reduce the load from inducing a power loss at the fork/sleeve interface. Moreover, since the balls are retractable within the hollow chamber of each sleeve, the shift sleeves can be disengaged from the notches by moving the respective shift sleeve in the unapply direction thereby moving the ball further into the hollow chamber and compressing the spring disposed therein. Although not shown in FIG. 5, the balls 502, 508 can be disposed within the hollow chamber of each pin anytime the respective diode is unapplied. However, as the diode is applied, the shift sleeve is moved in the apply direction and once the pin 500, 506 moves over the corresponding notch 446, 448, the ball 502, 508 can be pushed out of the hollow chamber by the spring 504, 510 to engage the corresponding notch 446, 448.

Figure 6:
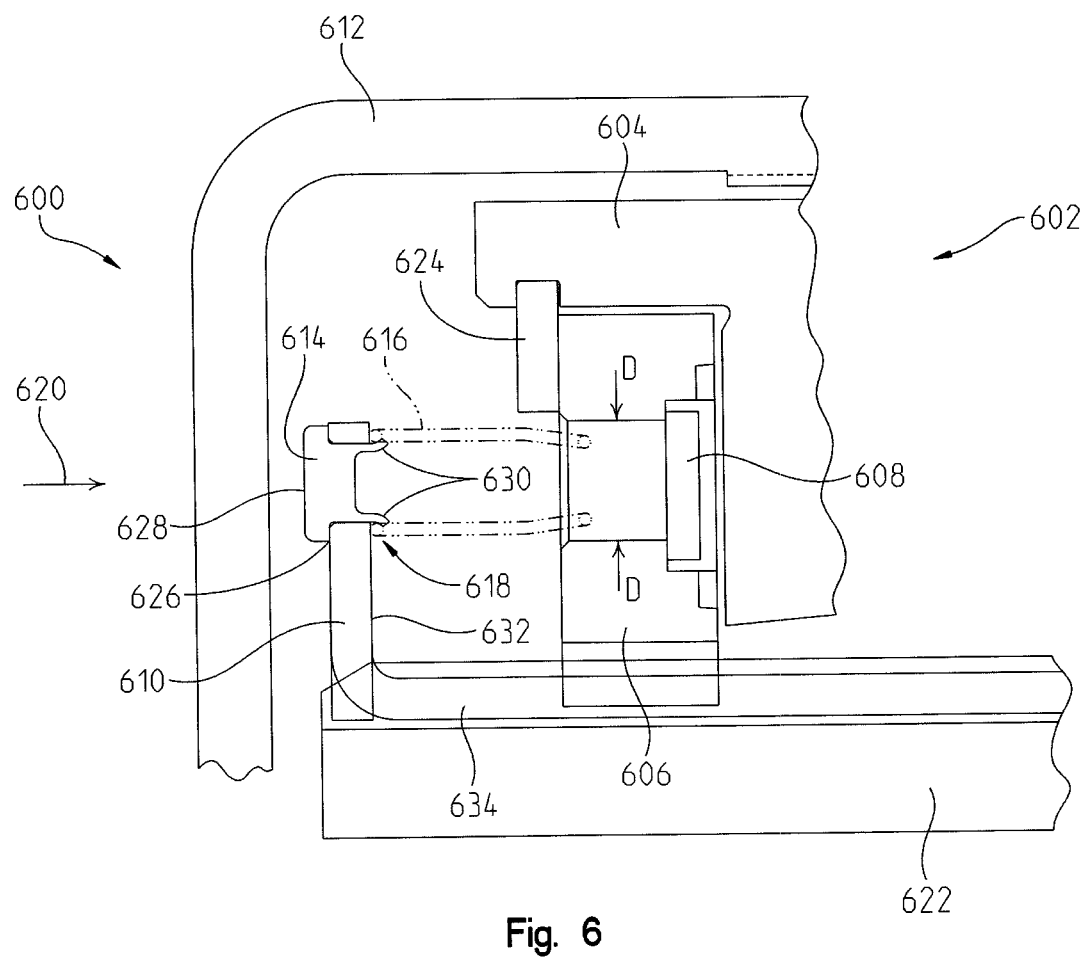
FIG. 6 is a schematic of an actuation plate for engaging a mechanical diode clutch assembly.

In FIG. 6, a different embodiment is shown of an actuation system 600 for engaging or applying a mechanical diode clutch assembly 602. The mechanical diode clutch assembly 602 can include an outer member 604 and an inner member 606. The inner member 606 can be coupled or splined to an inner body 622. The inner body 622 can be a driving mechanism or a stationary mechanism. The inner body 622 can be a drum, hub, gear, or housing. In addition, a retaining ring or clip 624 can position the inner member 606 relative to the outer member 604, as shown in FIG. 6. In one aspect, the outer and inner members can rotate at differential speeds when the clutch assembly is disengaged or unapplied. For instance, the clutch assembly can rotate freely in one direction in the unapplied state. Once the clutch assembly is applied or engaged, the outer and inner members can be locked or coupled to one another to form a one-way clutch.

To apply the mechanical diode clutch assembly 602, an actuation plate 610 can be moved by a shift sleeve (not shown) in direction 620. The actuation plate 610 can include an apply portion 632 formed as a bent or curved end thereof, and extending from the apply portion 632 is one of a plurality of legs 634 capable of coupling with the shift sleeve in a manner similar to that previously described.

In this embodiment, an outer housing 612 can preclude a shift sleeve from directly engaging a strut for applying the diode in a conventional manner. Instead, movement of the actuation plate 610 can induce movement of a strut 608 for being received within a recessed portion defined in the outer member 604. To induce strut movement, the apply portion 632 of the actuation plate 610 can include a defined opening. The size of the defined opening can be such as to receive a cap 614. The cap 614 can include a bulk head 628 that protrudes from one side of the defined opening. At the end opposite the bulk head 628, the cap 614 can include a radial-like protrusion or finger 630 for coupling to a spring 616. The radial-like protrusion or finger 630 can form an attachment means 618 for engaging or coupling to an end of the spring 616 such that the cap 614 and spring 616 are coupled to one another.

The diameter of the spring 616 is such that it can pass through an opening defined in the inner member 606. The defined opening can have a diameter, D, as shown in FIG. 6. This diameter can be sized such that the spring 616 can pass freely therethrough and contact the strut 608. In another aspect, the strut 608 can be coupled directly to the spring 616. In any event, the actuation plate 610 can be moved in direction 620 until the strut 608 is disposed in the recessed portion of the upper member 604. Once the strut 608 has reached its maximum displacement in the apply direction, any further movement of the actuation plate 610 can result in compression of the spring 616. Moreover, as the actuation plate 610 moves in the unapply direction (i.e., opposite the apply direction 620), the spring 616 can decompress until it reaches its uncompressed condition.

Figure 7:
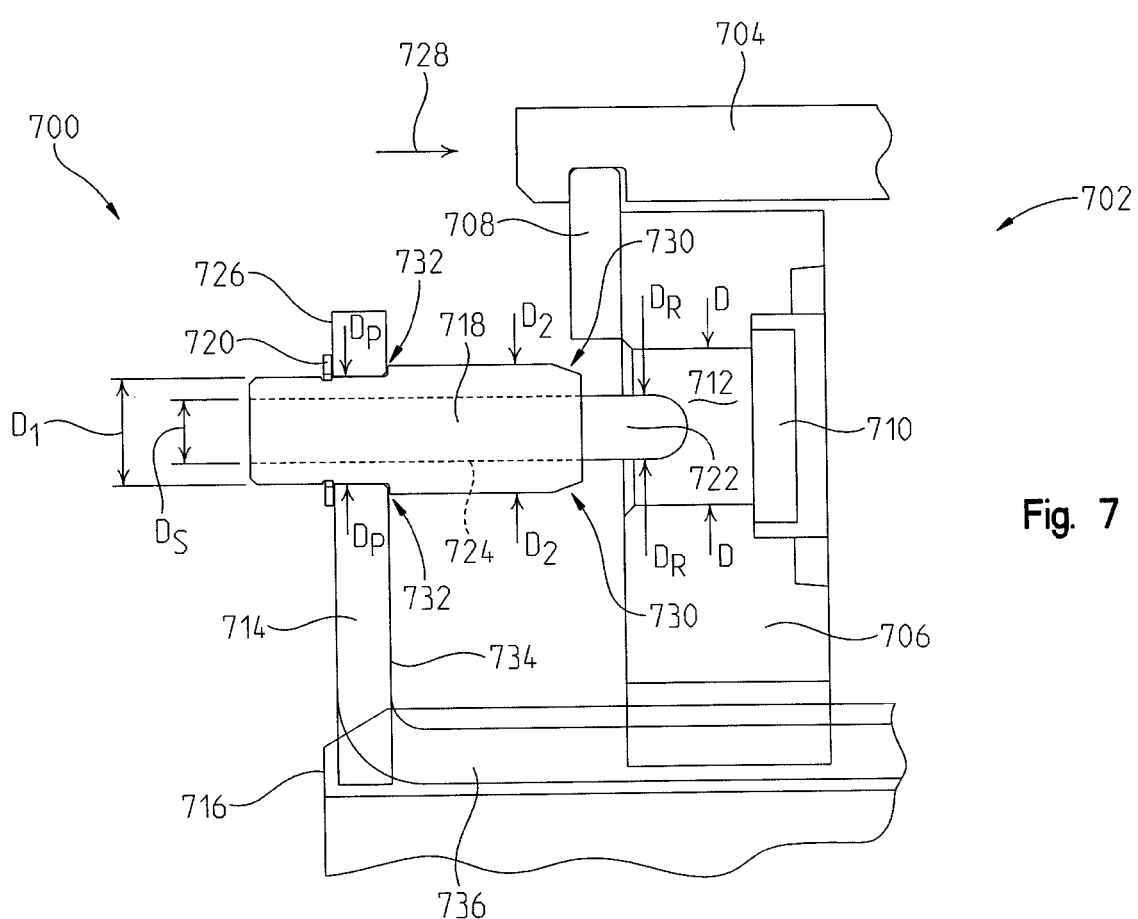
FIG. 7 is a schematic of another actuation plate for engaging a mechanical diode clutch assembly.

An alternative system 700 for applying a mechanical diode clutch assembly 702 is shown in FIG. 7. The mechanical diode clutch assembly 702 can include an outer member 704 and an inner member 706. The inner member 706 can be coupled or splined to an inner body 716. The inner body 716 can be a driving mechanism or a stationary mechanism. The inner body 716 can be a drum, hub, gear, or housing. In addition, a retaining ring or clip 708 can position the inner member 706 relative to the outer member 704, as shown in FIG. 7. In one aspect, the outer and inner members can rotate at differential speeds when the clutch assembly 702 is disengaged or unapplied. For instance, the clutch assembly 702 can rotate freely in one direction in the unapplied state. Once the clutch assembly 702 is applied or engaged, the outer and inner members can be locked or coupled to one another to form a one-way clutch.

To apply the mechanical diode clutch assembly 702, an actuation plate 714 can be moved by a shift sleeve (not shown) in direction 728. The actuation plate 714 can include an apply portion 734 formed as a bent or curved end thereof. In FIG. 7, one of a plurality of legs 736 is shown coupled to the apply portion 734 of the actuation plate 714. The plurality of legs 736 can be integrally coupled to the apply portion 734, mechanically fastened to one another, adhered, welded, or coupled to one another in other known ways. Each of the plurality of legs 736 is capable of coupling to the shift sleeve in a manner similar to that previously described. Thus, movement of the shift sleeve can induce movement of the plurality of legs 736, thereby causing the actuation plate 714 to move in a concomitant relationship with the shift sleeve.

Although not shown, an outer housing can preclude a shift sleeve (not shown) from directly engaging a strut for applying the diode in a conventional manner. Instead, movement of the actuation plate 714 can induce movement of a strut 710 for being received within a recessed portion (not shown) defined in the outer member 704. To induce strut movement, the actuation plate 714 can include an opening defined in a bent or curved end 726 thereof. The size of the defined opening, e.g., diameter $D_P$, can be such as to receive a plunger 718. The plunger 718 can include a substantially hollow interior that is sized to receive a retractable member 722 and a spring 724. The retractable member 722 can be coupled to one end of the spring 724, whereas the opposite end of the spring 724 can be coupled within the plunger 718. In an alternative aspect, the spring 724 may include a diameter, $D_S$, such that the spring 724 is confined within the interior of the plunger 718.

The plunger 718 can be coupled to the actuation plate 714 via a retaining clip or fastener 720. For example, a notch or groove can be defined within an outer surface of the plunger 718 in which the clip or fastener 720 is received. The retaining clip or fastener 720 can limit or prevent the plunger 718 from moving in the apply direction 728 relative to the actuation plate 714. In addition, the plunger 718 can have limited movement in the apply direction 728 due to shoulder 732 of the plunger 718 contacting the actuation plate 714. Here, the diameter of the opening, $D_P$, in the actuation plate 714 can be such that it receives a first portion of the plunger 718 having a first diameter, $D_1$. Another portion of the plunger 718, however, can include a second diameter, $D_2$, that is greater than the first diameter, $D_1$. The shoulder 732 is defined at the interface between the first diameter, $D_1$, and second diameter, $D_2$. In this aspect, the second diameter, $D_2$, is greater than the diameter of the defined opening, $D_P$, in the actuation plate 714, thereby limiting movement of the plunger 718 in the unapply direction (i.e., opposite the apply direction 728).

As the mechanical diode clutch assembly 702 is applied, the actuation plate 714 moves in the apply direction 728. As such, the plunger 718 also moves in the apply direction 728. In doing so, the retractable member 722 of the plunger 718 can pass through a channel or cavity 712 defined in the inner member 706. The plunger 718 can include a chamfered end 730 that further facilitates movement of the plunger into this channel or cavity 712. As the actuation plate 714 moves further in the apply direction 728, the retractable member 722 can come into contact with the strut 710. The retractable member 722 can initially compress the spring 724 upon contact with the strut 710, but the spring 724 can be designed with a spring constant such that the spring force urges the retractable member 722 towards the strut 710. The strut 710 can be moved completely or partially into a recessed portion (not shown) of the outer member 704 to couple the outer member 704 and inner member 706 to one another. Once the strut 710 reaches its maximum displacement in the apply direction 728, the strut cannot be moved any further. Continued movement of the actuation plate 714 therefore results in the retractable member 722 compressing the spring 724 by some amount less than the spring's fully compressed position. Once the actuation plate 714 moves in the unapply direction, the spring 724 can decompress and the retractable member 722 can move in the apply direction 728 out of the hollow interior of the plunger 718.

Other configurations of a cap, pin, or plunger can be used in the embodiments of FIGS. 1-7. Moreover, the detent structure of FIGS. 4 and 5 can be incorporated into any embodiment. It is also to be understood that the actuation plates and mechanical diodes can be applied in any direction other than those previously described. The embodiments both described and illustrated can be used in an automatic transmission that includes a plurality of ranges having discrete gear ratios, or it can be incorporated into an infinitely variable or continuously variable transmission.

Figure 9:
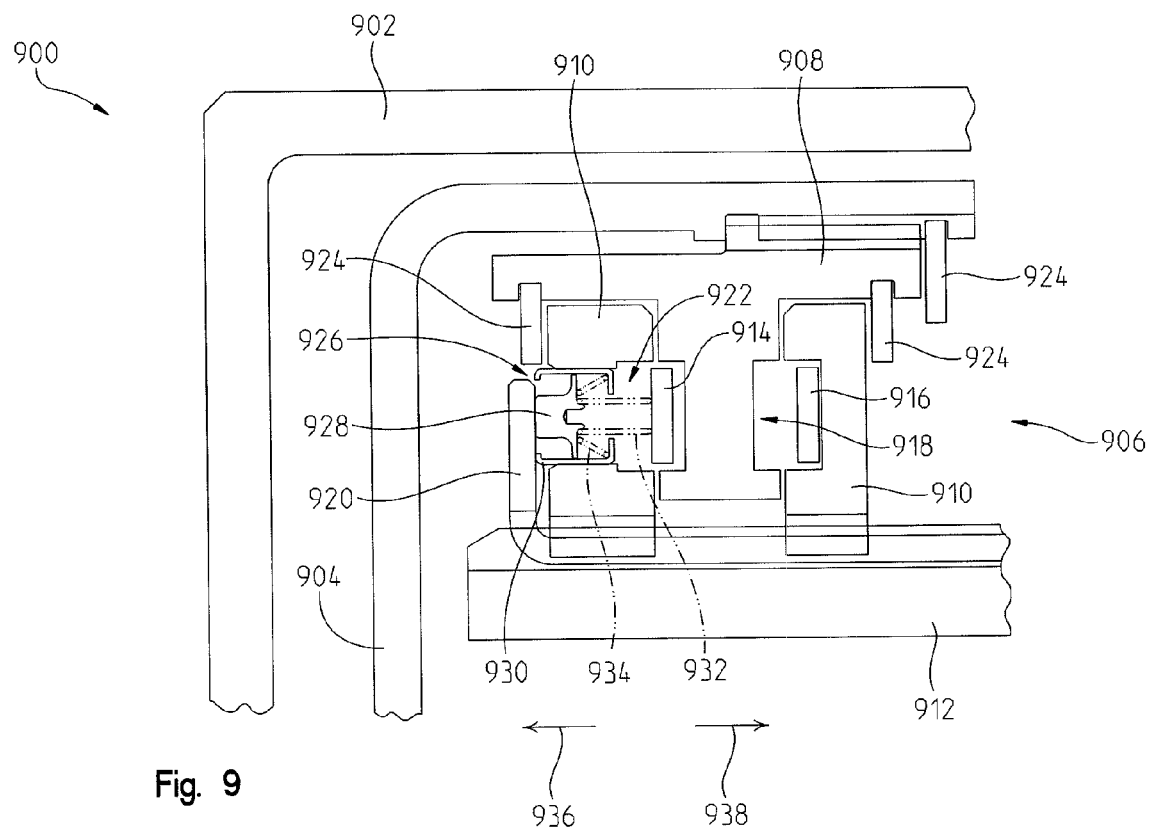
FIG. 9 is a partial schematic of another embodiment of an actuation mechanism of a mechanical diode clutch assembly in an applied position.

Referring to FIG. 9, a different system 900 is shown for applying a mechanical diode clutch assembly 906. Similar to the other illustrated embodiments, the system 900 can include an outer drum or housing 902. The outer drum 902 can be a stationary or rotating drum, depending on the embodiment. The outer drum 902 can partially or substantially surround another outer body or housing 904. In one aspect, the outer body or housing 904 can form part of a rotating clutch assembly. In another aspect, the outer body or housing 904 can form a drum or hub that can be stationary or rotating.

The mechanical diode clutch assembly 906 can include an outer member 908 and an inner member 910. The inner member 910 can be coupled or splined to an inner body 912. The inner body 910 can be a driving mechanism or a stationary mechanism. The inner body 912 can be a drum, hub, gear, or housing. In addition, a retaining ring or clip 924 can position the inner member 910 relative to the outer member 908, as shown in FIG. 9. In one aspect, the outer and inner members can rotate at differential speeds when the clutch assembly 906 is disengaged or unapplied. For instance, the clutch assembly 906 can rotate freely in one direction in the unapplied state. Once the clutch assembly 906 is applied or engaged (as is the condition in FIG. 9), the outer and inner members can be locked or coupled to one another to form a one-way clutch.

Figure 10:
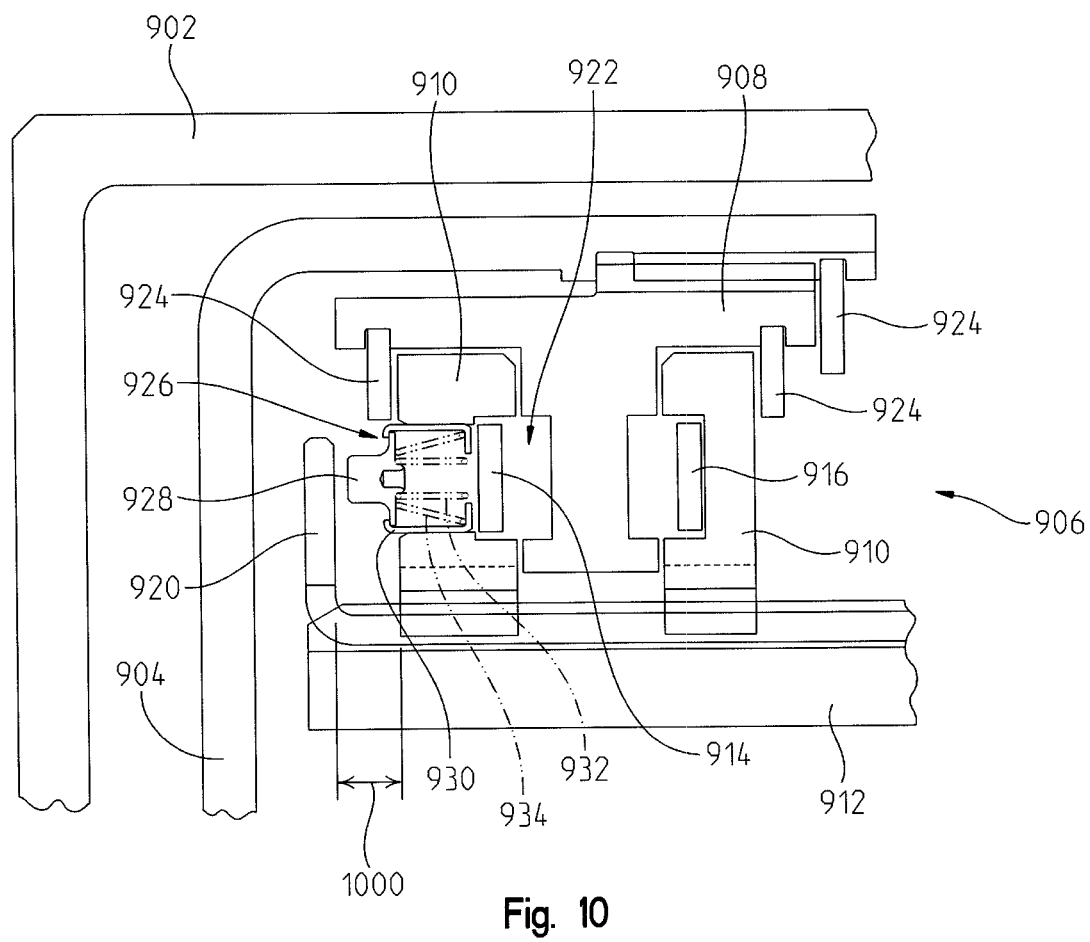
FIG. 10 is a partial schematic of the actuation mechanism of FIG. 9 in an unapply position.

The mechanical diode clutch assembly 906 of FIG. 9 can be used in a commercial transmission for changing modes. To change or switch to a different mode, struts are provided for being activated to either lock or unlock the clutch assembly 906. In FIG. 9, the mechanical diode clutch assembly 906 includes a first strut 914 and a second strut 916. Each of the first strut 914 and second strut 916 can be moved into a recess or opening 918 formed in the outer member 908 to activate the strut. In FIG. 9, for example, the first strut 914 can be moved in an apply or activation direction 938 into a corresponding recess or opening 918 defined in the outer member 908. To release or deactivate the first strut 914, the first strut 914 can be moved in an unapply or deactivation direction 936 away from the recess or opening 918. In FIG. 9, the first strut 914 is disposed in the activated position to lock the clutch assembly 906. In FIG. 10, however, the first strut 914 is disposed in the deactivated or unapplied position. Movement of the first strut 914 between these two positions defines a stroke distance 1000 as shown in more detail in FIG. 10.

To apply the mechanical diode clutch assembly 906, an actuation member 920 can be moved by a shift sleeve (not shown) or other device in the apply direction 938. The actuation member 920 can move in the apply direction 938 from the unapply position (FIG. 10) to the apply position (FIG. 9) by the stroke distance 1000. As described above, in most conventional applications, there is access to the mechanical diode clutch assembly for activating the strut. In the configuration of FIG. 9, however, the outer body or housing 904 precludes or blocks access to the first strut 914. Moreover, the amount of stroke available in this configuration is limited for applying the first strut 914.

To apply the strut with limited access and stroke, the previous illustrated embodiments provided actuation members that were directly coupled to actuation mechanisms. In FIG. 9, a different actuation mechanism 926 is shown. Here, the actuation mechanism 926 can include a pin 928 and capsule 930 that forms an encapsulated actuation mechanism. The actuation mechanism 926 can include a pair of springs, an apply spring 932 and a return spring 934. The apply spring 932 can be a coil spring and the return spring 934 can be a conical spring. In other aspects, the apply spring 932 and return spring 934 can be different types of springs used for applying and unapplying the mechanical diode clutch assembly 906. In FIG. 9, the apply spring 932 can be disposed within a cavity 922 defined between the outer member 908, inner member 910, and actuation mechanism 926. The recess or opening 918 formed in the upper member 908 forms part of the cavity 922 such that the first strut 914 moves in the cavity 922 between the apply position and unapply position.

As shown in FIG. 9, the actuation member 920 engages and remains in contact with the actuation mechanism 926 in the apply position. However, as the actuation member 920 is moved in the unapply direction 936, at some point during this movement the actuation member 920 disengages from the actuation mechanism 926 such that neither part is in contact with the other. In other words, the actuation member 920 and actuation mechanism 926 can be coupled to one another when the apply spring 932 and first strut 914 are aligned with one another, and the two can be decoupled from one another when releasing or unapplying the mechanical diode clutch assembly 906.

In the apply position of FIG. 9, the apply spring 932 can extend partially outside the capsule 930 to engage the first strut 914. In the unapply position of FIG. 10, the apply spring 932 is substantially disposed within the capsule 930. As illustrated in both embodiments, the return spring 934 remains substantially enclosed within the capsule 930.

The apply spring 932 can be at least partially compressed as it engages the first strut 914 and moves the first strut 914 into the active or apply position. The apply spring 932, however, can be biased towards its uncompressed or free condition where it is not compressed. This is best shown in FIG. 10. Moreover, in FIG. 10, the return spring 934 can be free or slightly compressed in this position. As the first strut 914 is engaged, however, the return spring 934 can be compressed within the capsule 930. In the event the return spring 934 is a conical spring, the return spring 934 can compress and collapse inside itself to allow for the actuation mechanism 926 and actuation member 920 to move through the entire stroke distance 1000. To release the clutch, the return spring 934 can return to its uncompressed, biased condition.

As is shown in the illustrated embodiments of FIGS. 9 and 10, the pin 928 can move substantially along the apply direction 938 and unapply direction 936 relative to the capsule 930. In the unapply position of FIG. 10, the pin 928 can be disposed substantially outside of the capsule 930. However, as the actuation member 920 moves in the apply direction 938, it contacts and forces the pin 928 to move or slide relative to the capsule 930 in the apply direction 938. In this case, the capsule 930 is positioned within an opening of or coupled to the inner member 910 of the mechanical diode clutch assembly 906. As such, movement of the actuation member 920 and pin 928 does not induce any movement of the capsule 930 in either direction. Thus, as the pin 928 moves relative to the capsule 930, the return spring 934 is compressed as the pin 928 moves in the apply direction 938 and the return spring 934 is decompressed as the pin 928 moves in the unapply direction 936.

Figure 11:
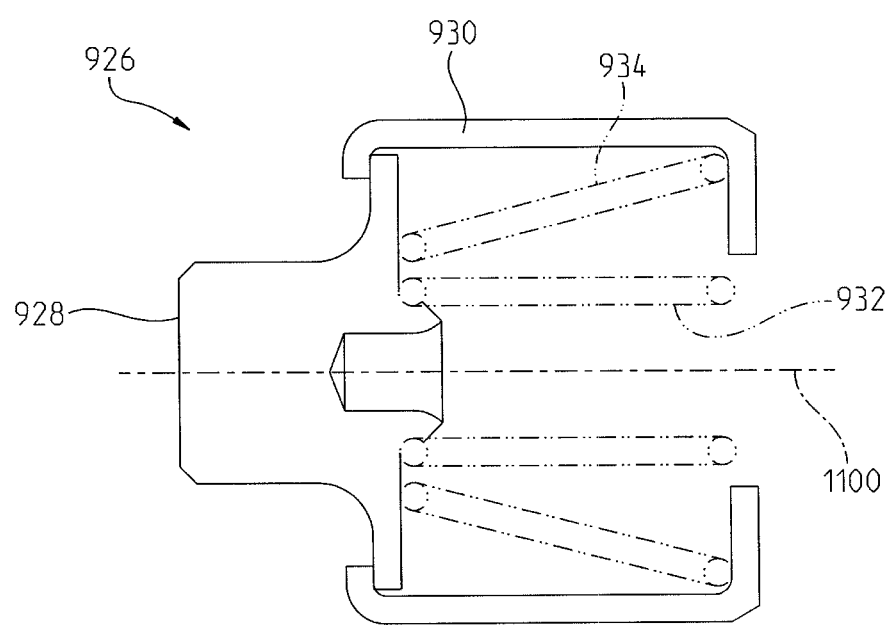
FIG. 11 is a cross-sectional view of the actuation mechanism of FIG. 9.
Figures 12, 13:
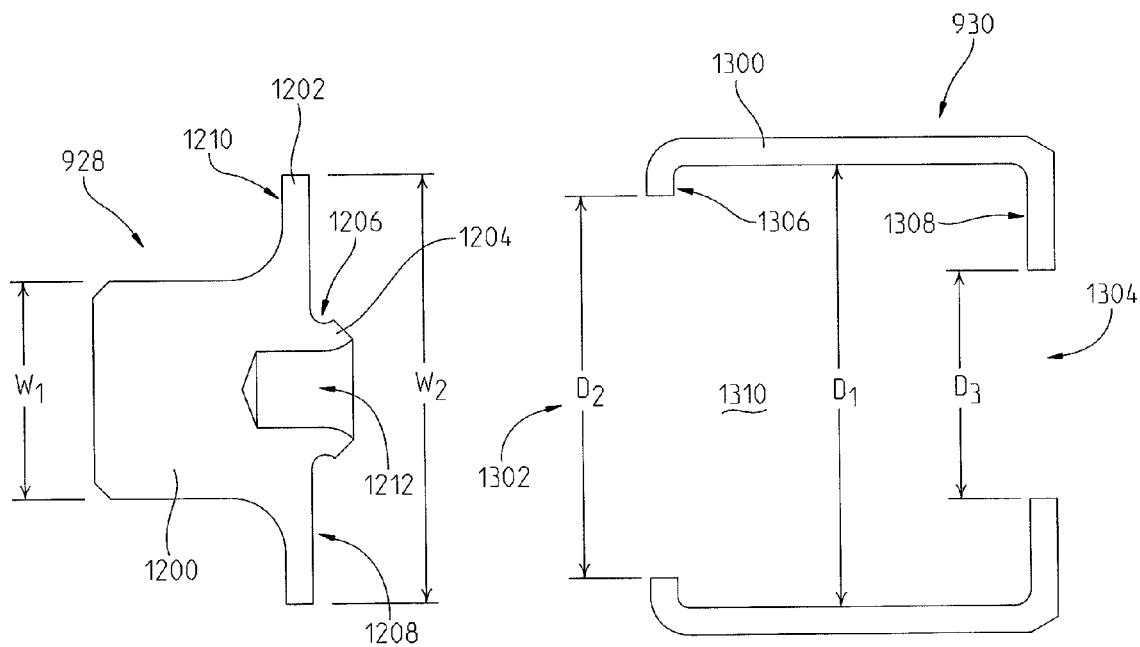
FIG. 12 is a cross-sectional view of a pin of the actuation mechanism of FIG. 9.
FIG. 13 is a cross-sectional view of a capsule of the actuation mechanism of FIG. 9.

The interaction of the different components of the actuation mechanism is shown in FIGS. 11-13. In the illustrated embodiment of FIG. 11, the actuation mechanism 926 is shown in the unapply position. As the pin 928 is moved in either the apply or unapply directions, it does so along a substantially linear axis 1100. Thus, the substantially linear movement of the pin 928 can allow the apply spring 932 to be positioned such that it can pass through an opening defined in the capsule 930.

In FIG. 12, the pin 928 can include a body 1200 and a radially extending arm 1202 that is integrally formed with the body 1200. The body 1200 can have a first width or diameter, $W_1$, and the arm 1202 can have a second width or diameter, $W_2$. The second width, $W_2$, can be greater than the first width, $W_1$, as shown in the illustrated embodiment. The pin 928 can also include a radially, curled end 1204. The curled end 1204 forms an opening or receptacle 1206 to which one end of the apply spring 932 can be coupled to the pin 928. The diameter of the apply spring 932 can be such that the apply spring 932 can be securely coupled to the pin 928.

The arm 1202 of the pin 928 can include a first defined surface 1208 and a second defined surface 1210. The return spring 934 can be disposed in contact with the first surface 1208 as shown in FIG. 11. The opposite end of the return spring 934 can be disposed in contact with a second surface 1308 of the capsule 930 (see FIG. 13). The capsule 930 can include a first surface 1306 that is engaged with the second surface 1210 of the pin 928 in the unapply position of FIG.

11. In this position, the return spring 934 biases the second surface 1210 of the pin 928 into contact with the first surface 1306 of the capsule 930.

Referring to FIG. 13, the capsule 930 can be defined as a cylindrical body 1300 that defines an interior chamber 1310 in which the apply spring 932 and return spring 934 are disposed. The capsule 930 can include a first end 1302 and a second end 1304, each of which defines an opening therein. The interior chamber 1310 of the cylindrical body 1300 can have a first diameter, $D_1$. The opening at the first end 1302 can have a second diameter, $D_2$, and the opening at the second end 1304 can have a third diameter, $D_3$. In the illustrated embodiment of FIG. 13, the first diameter, $D_1$, is greater than both the second diameter, $D_2$, and third diameter, $D_3$. The second diameter, $D_2$, can be greater than the third diameter, $D_3$. In this embodiment, the second diameter, $D_2$, is sized for receiving the body 1200 of the pin 928. Moreover, the third diameter, $D_3$, is sized to allow the apply spring 934 to extend and retract therethrough. While the first diameter, $D_1$, can be sized greater than the second and third diameters, the first diameter, $D_1$, is at least the same as or slightly greater than the second width, $W_2$, of the pin 928. The first diameter, $D_1$, can also be sized based on the largest diameter of the return spring 934.

The illustrated embodiments of FIGS. 9-13 provide various embodiments of the actuation mechanism 926. In other embodiments, however, the apply spring 932 or return spring 934 can be disposed within a central bore 1212 defined in the pin 928. In another embodiment, the return spring 934 may be a coil spring with a larger diameter than the apply spring 932. In a further alternative embodiment, the apply spring 932 can have a larger diameter than the return spring 934. Other aspects and embodiments that can achieve similar functionality are also contemplated within this disclosure.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An actuation mechanism for applying a mechanical diode clutch, comprising:
    a capsule including a cylindrical body defining an interior chamber, the cylindrical body defining a first opening at a first end and a second opening at a second end thereof;
    a pin having a body and a radially-extending arm, the pin being retained within the interior chamber of the capsule;
    an apply spring coupled at one end to the pin; and
    a return spring being retained within the interior chamber of the capsule, the return spring being disposed between the pin on one end and the cylindrical body on the opposite end thereof;
    wherein, both the apply spring and the return spring contact the pin;
    wherein, the pin is movable along a substantially linear axis between an apply position and an unapply position;
    wherein, the return spring substantially surrounds the apply spring;
    wherein, the apply spring is a coil spring and the return spring is a conical spring.

2. The actuation mechanism of claim 1, wherein the pin moves relative to the capsule between the apply and unapply positions.

3. The actuation mechanism of claim 1, wherein the pin is engaged by the capsule in the unapply position.

4. The actuation mechanism of claim 1, wherein the return spring biases the pin to the unapply position.

5. The actuation mechanism of claim 1, wherein:
    the return spring is compressed between the pin and capsule in the apply position; and
    the return spring is either decompressed or only partially compressed in the unapply position.

6. The actuation mechanism of claim 1, wherein the apply spring is substantially aligned with the second opening of the capsule.

7. The actuation mechanism of claim 1, wherein:
    a diameter of the first opening is greater than a diameter of the second opening; and
    a diameter of the interior chamber is about the same as the diameter of the radially-extending arm.

8. An actuation mechanism for applying a mechanical diode clutch, comprising:
    a capsule including a cylindrical body defining an interior chamber, the cylindrical body defining a first opening at a first end and a second opening at a second end thereof;
    a pin having a body and a radially-extending arm, the pin being retained within the interior chamber of the capsule;
    an apply spring coupled at one end to the pin; and
    a return spring being retained within the interior chamber of the capsule, the return spring being disposed between the pin on one end and the cylindrical body on the opposite end thereof;
    wherein the pin is movable along a substantially linear axis between an apply position and an unapply position;
    wherein, the return spring substantially surrounds the apply spring;
    wherein the apply spring is coupled to a curved end of the pin; and
    wherein the apply spring is positioned within a bore defined in the pin.

9. The actuation mechanism of claim 8, further wherein the pin moves relative to the capsule between the apply and unapply positions.

10. A transmission system, comprising:
    a mechanical diode clutch including an outer member and an inner member, the outer member being coupled to an outer body and the inner member being coupled to an inner body, where the outer member is structured to define a recessed opening;
    a strut positioned relative to the outer member for being at least partially received in the recessed opening in an apply position;
    an actuation member adapted to be coupled to a shift fork, the actuation member being movable between the apply position and an unapply position;
    a capsule including a cylindrical body defining an interior chamber, the cylindrical body defining a first opening at a first end and a second opening at a second end thereof;
    a pin having a body and a radially-extending arm, the pin being retained within the interior chamber of the capsule;

an apply spring coupled at one end to the pin; and a return spring being retained within the interior chamber of the capsule, the return spring being disposed between the pin on one end and the cylindrical body on the opposite end thereof;

wherein, the actuation member is engaged with the pin in the apply position and disengaged with the pin in the unapply position;

further wherein, in the apply position, the apply spring is disposed in contact with the strut.

11. The system of claim 10, wherein the capsule is coupled to the inner member of the mechanical diode clutch.

12. The system of claim 10, wherein a cavity is defined between the outer member, the inner member, and the capsule.

13. The system of claim 12, wherein the apply spring and the strut are movable within the cavity between the apply and unapply positions.

14. The system of claim 10, wherein the return spring substantially surrounds the apply spring.

15. The system of claim 14, wherein the pin moves relative to the capsule between the apply and unapply positions.

16. The system of claim 15, wherein the pin is engaged by the capsule in the unapply position.

17. The system of claim 15, wherein the return spring biases the pin to the unapply position.

18. The system of claim 15, wherein:

the return spring is compressed between the pin and capsule in the apply position; and the return spring is either decompressed or only partially compressed in the unapply position.

19. The system of claim 10, wherein the apply spring is a coil spring and the return spring is a conical spring.

20. The system of claim 10, wherein the pin is movable along a substantially linear axis between an apply position and an unapply position.

* * * * *